US012759323B2

(12) United States Patent
Takano et al.

(10) Patent No.: US 12,759,323 B2
(45) Date of Patent: Oct. 13, 2026

(54) SHEET DISCHARGING APPARATUS, AND SHEET POST-PROCESSING APPARATUS AND IMAGE FORMING APPARATUS PROVIDED THEREWITH

(71) Applicant: KYOCERA Document Solutions Inc., Osaka (JP)

(72) Inventors: Yusuke Takano, Osaka (JP); Yasunori Ueno, Osaka (JP); Terumitsu Noso, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 33 days.

(21) Appl. No.: 19/085,272

(22) Filed: Mar. 20, 2025

(65) Prior Publication Data

US 2025/0313022 A1 Oct. 9, 2025

(30) Foreign Application Priority Data

Apr. 4, 2024 (JP) ................................. 2024-060912

(51) Int. Cl.
*B41J 13/10* (2006.01)
*B41J 3/44* (2006.01)

(52) U.S. Cl.
CPC ............... *B41J 13/106* (2013.01); *B41J 3/44* (2013.01)

(58) Field of Classification Search
CPC .................................. B41J 13/106; B41J 3/44
See application file for complete search history.

(56) References Cited

U.S. PATENT DOCUMENTS

| | | | | |
|---|---|---|---|---|
| 8,989,615 B2 * | 3/2015 | Matsuno | G03G 21/20 | 399/92 |
| 11,738,963 B2 * | 8/2023 | Takano | B65H 31/38 | 271/278 |
| 2011/0074899 A1 * | 3/2011 | Chiwata | B65H 31/00 | 347/104 |
| 2012/0081487 A1 * | 4/2012 | Tanaka | B41J 13/106 | 347/104 |
| 2013/0236228 A1 | 9/2013 | Nagasako et al. | 399/405 | |
| 2015/0253716 A1 | 9/2015 | Nagasako et al. | G03G 15/6552 | |
| 2018/0290852 A1 * | 10/2018 | Okada | G03G 15/6552 | |
| 2021/0347595 A1 * | 11/2021 | Takano | B65H 31/38 | |

FOREIGN PATENT DOCUMENTS

| | | |
|---|---|---|
| JP | 2013-184809 A | 9/2013 |
| JP | 2018-177455 A | 11/2018 |

* cited by examiner

*Primary Examiner* — Michael Collins
(74) *Attorney, Agent, or Firm* — Stein IP, LLC

(57) ABSTRACT

A sheet discharging apparatus includes a sheet discharge port, a discharging member, a sheet discharge tray, and a blowing mechanism. The discharging member is disposed at the sheet discharge port and conveys a sheet in the discharge direction. The sheet discharge tray is disposed downstream of the sheet discharge port along the discharge direction and the sheet discharged from the sheet discharge port is stacked on it. The blowing mechanism has a blowing port through which a stream of air is blown from above toward the sheet discharged from the sheet discharge port and a blowing device that is coupled to the blowing port and that produces the stream of air. The blowing mechanism can adjust the blowing position of the stream of air with respect to the sheet according to the size of the sheet along the width direction.

10 Claims, 7 Drawing Sheets

SHEET DISCHARGING APPARATUS, AND SHEET POST-PROCESSING APPARATUS AND IMAGE FORMING APPARATUS PROVIDED THEREWITH

INCORPORATION BY REFERENCE

This application is based on and claims the benefit of priority from Japanese Patent Application No. 2024-60912 filed on Apr. 4, 2024, the contents of which are hereby incorporated by reference.

BACKGROUND

The present disclosure relates to a sheet discharging apparatus that discharges a sheet having an image formed on it by an image forming apparatus, and also relates to a sheet post-processing apparatus and an image forming apparatus provided with such a sheet discharging apparatus.

Image forming apparatuses such as copiers and printers, and also sheet post-processing apparatuses for performing post-processing on sheets, are provided with a sheet discharging apparatus that includes a pair of discharge rollers and a discharge tray. Sheets (paper) having images formed on them by an image forming apparatus are discharged to the discharge tray by the sheet discharging apparatus provided in the image forming apparatus. Or sheets are fed into a sheet post-processing apparatus to be subjected to predetermined post-processing and are then discharged to the discharge tray by the sheet discharging apparatus provided in the sheet post-processing apparatus.

Such sheet discharging apparatuses suffer from untidiness of the stack of sheets on the discharge tray resulting from sticking-together among the discharged sheets, buckling and curling of the sheets, and the like. One known way to stabilize the discharge of sheets is to blow air to them from above a sheet discharge port with a fan.

SUMMARY

According to one aspect of the present disclosure, a sheet discharging apparatus includes a sheet discharge port, a discharging member, a sheet discharge tray, and a blowing mechanism. Through the sheet discharge port, a sheet is discharged. The discharging member disposed at the sheet discharge port, and conveys the sheet in a discharge direction. The sheet discharge tray is disposed downstream of the sheet discharge port with respect to the discharge direction, and the sheet discharged from the sheet discharge port is stacked on it. The blowing mechanism blows a stream of air to the sheet discharged from the sheet discharge port. The blowing mechanism has: a pair of blowing ports through which the stream of air is blown from upward to opposite end parts, along the width direction orthogonal to the discharge direction of the sheet, of the sheet discharged from the sheet discharge port; and a blowing device that is coupled to the blowing ports and that produces the stream of air. The blowing position of the stream of air with respect to the sheet can be adjusted according to the size of the sheet along the width direction.

DETAILED DESCRIPTION

Figure 1:
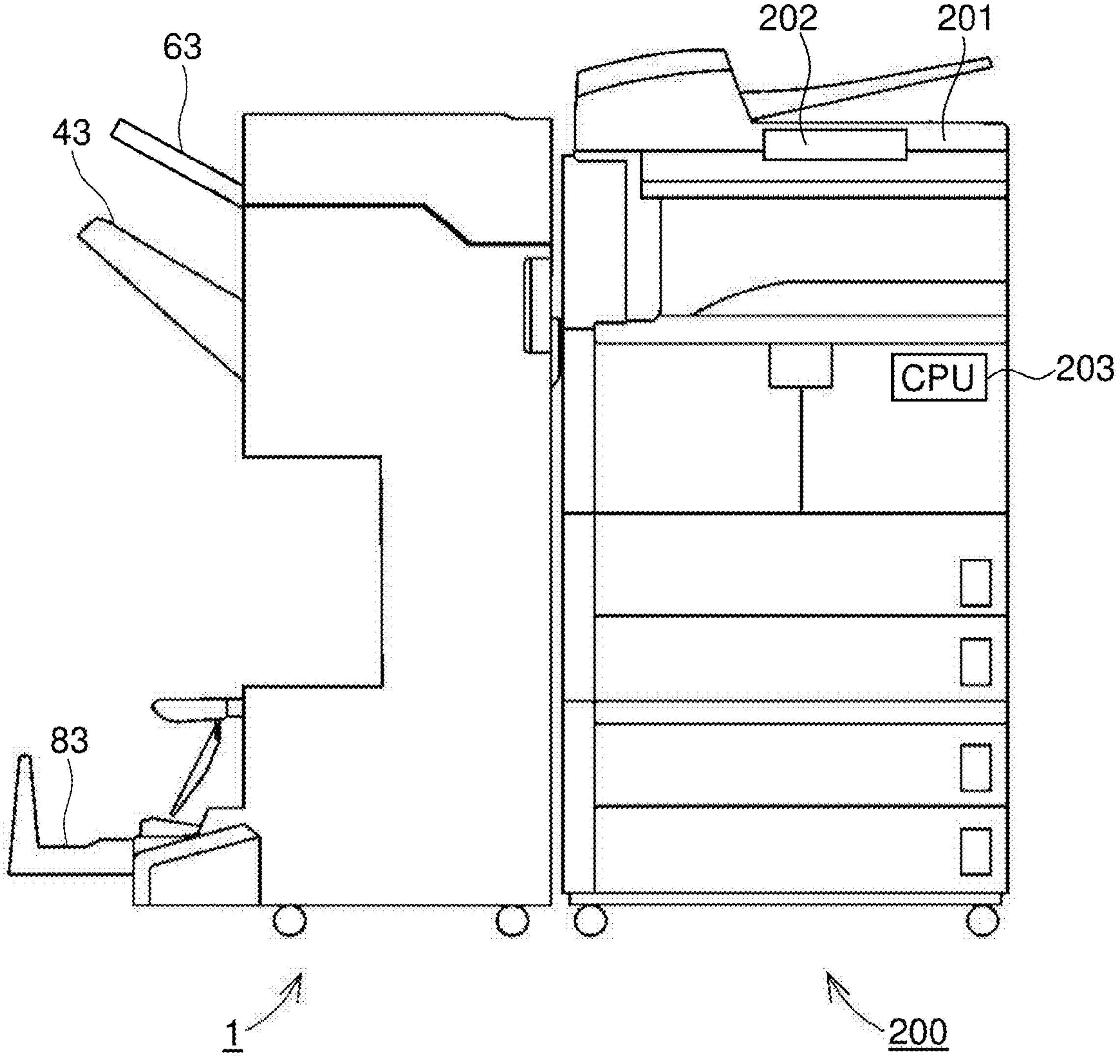
FIG. 1 is a schematic diagram showing a configuration of an image forming system configured with a sheet post-processing apparatus according to one embodiment of the present disclosure and an image forming apparatus to which the sheet post-processing apparatus is coupled.

1. Configuration of an Image Forming System: An embodiment of the present disclosure will be specifically described below with reference to the accompanying drawings. FIG. 1 is a schematic diagram showing the configuration of an image forming system configured with a sheet post-processing apparatus 1 according to one embodiment of the present disclosure and an image forming apparatus 200 to which the sheet post-processing apparatus 1 is coupled.

As shown in FIG. 1, the image forming apparatus 200 prints an image on a sheet (paper) based on image data fed in from outside via an unshown network communication portion or image data read by an image reading portion 201 disposed in an upper part of the image forming apparatus 200. In this embodiment, the image forming apparatus 200 is an inkjet recording apparatus provided with recording heads (not shown), one for each of different colors, that have a number of nozzle apertures through which ink is ejected onto sheets.

At the front of the image reading portion 201, an operation panel 202 is disposed. The operation panel 202 is an operation portion for accepting the input of various settings. For example, a user can operate the operation panel 202 to enter information on the size of sheets. Likewise, the user can operate the operation panel 202 to enter the number of sheets to be printed or an instruction to start a print job. A main unit control portion 203 coordinates the operation of the entire image forming apparatus 200 to control different parts in the image forming apparatus 200.

The sheet post-processing apparatus 1 is removably coupled to a side face of the image forming apparatus 200. The sheet post-processing apparatus 1 performs post-processing, such as punch hole formation and binding, on sheets having images formed (printed) on them by the image forming apparatus 200. The sheet post-processing apparatus 1 need not be one that performs post-processing on sheets automatically conveyed from the image forming apparatus 200; it may be one that itself conveys sheets set on an unshown tray by a user to a position where it can perform post-processing on them and that then performs the post-processing.

Figure 2:
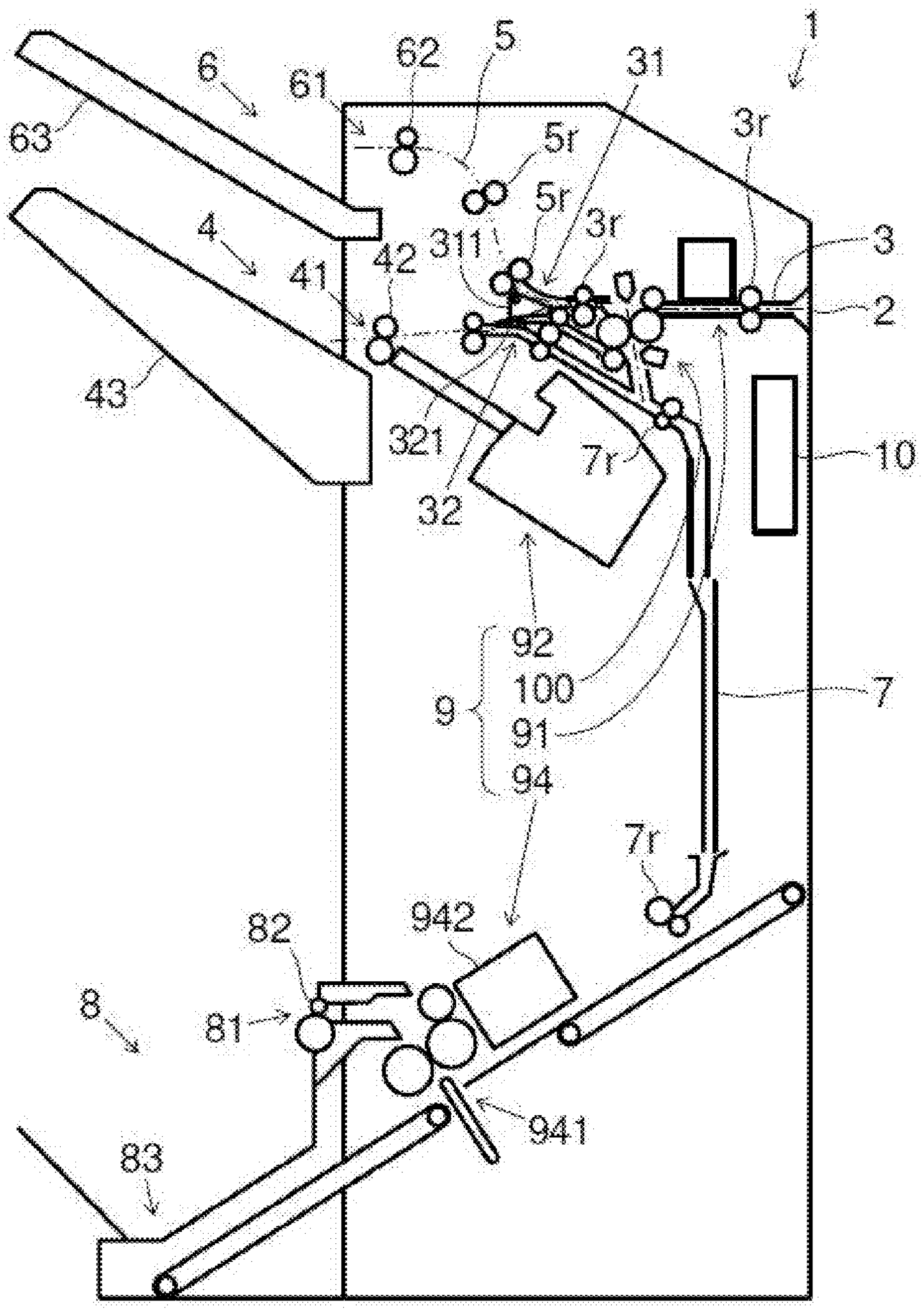
FIG. 2 is a side sectional view schematically showing the configuration of the sheet post-processing apparatus according to the embodiment.

2. Configuration of the Sheet Post-Processing Apparatus:

FIG. 2 is a side sectional view schematically showing the configuration of the sheet post-processing apparatus 1 according to this embodiment. As shown in FIG. 2, the sheet post-processing apparatus 1 includes a sheet introduction port 2. a first sheet conveyance passage 3, a first sheet discharge portion 4, a second conveyance passage 5, a second sheet discharge portion 6, a third sheet conveyance passage 7, a third sheet discharge portion 8, a post-processing portion 9, and a post-processing control portion (control portion) 10.

The sheet introduction port 2 is an opening provided in the side face of the sheet post-processing apparatus 1 facing the image forming apparatus 200. A sheet conveyed from the image forming apparatus 200 toward the sheet post-processing apparatus 1 passes through the sheet introduction port 2 to be fed into the sheet post-processing apparatus 1.

The first sheet conveyance passage 3 extends from the sheet introduction port 2 to the first sheet discharge portion 4, substantially horizontally in a direction away from the image forming apparatus 200 (leftward in FIG. 2). The direction from the sheet introduction port 2 to the first sheet discharge portion 4 is referred to the sheet conveyance direction in the first sheet conveyance passage 3. The sheet introduction port 2 is located at the upstream end of the first sheet conveyance passage 3 in the sheet conveyance direction. The first sheet conveyance passage 3 has a plurality of pairs of conveyance rollers **3*r* and conveys the sheet fed through the sheet introduction port 2 into the sheet post-processing apparatus 1** downstream in the sheet conveyance direction.

The first sheet discharge portion 4 is provided on the side face of the sheet post-processing apparatus 1 opposite from its face facing the image forming apparatus 200. The first sheet discharge portion 4 is disposed at the downstream end of the first sheet conveyance passage 3 in the sheet conveyance direction. The first sheet discharge portion 4 has a first discharge port 41, a pair of first discharge rollers 42, and a first discharge tray 43.

The first discharge port 41 is located at the downstream end of the first sheet conveyance passage 3 in the sheet conveyance direction. The pair of first discharge rollers 42 is disposed at the first discharge port 41. The first discharge tray 43 is located downstream of the first discharge port 41 in the sheet conveyance direction. The sheet conveyed along the first sheet conveyance passage 3 to reach the first discharge port 41 is discharged through the first discharge port 41 to the first discharge tray 43 by the pair of first discharge rollers 42. The first discharge tray 43 is one of the final discharge locations of sheets having undergone post-processing by the sheet post-processing apparatus 1. Also discharged to the first discharge tray 43 are sheets that are not subjected to post-processing, small-size sheets, and the like.

The second conveyance passage 5 branches off the first sheet conveyance passage 3 at a first branch portion (branch portion) 31 along it and extends up to the second sheet discharge portion 6, sideways and upward in a direction away from the image forming apparatus 200 (leftward in FIG. 2). The first branch portion 31 is disposed downstream of a punching portion 91 with respect to the sheet conveyance direction in the first sheet conveyance passage 3. The direction from the first branch portion 31 to the second sheet discharge portion 6 is referred to the sheet conveyance direction in the second conveyance passage 5. The first branch portion 31 is located at the upstream end of the second conveyance passage 5 in the sheet conveyance direction. The second conveyance passage 5 has a plurality of conveyance rollers **5*r* and diverts the sheet conveyed along the first sheet conveyance passage 3 at the first branch portion 31 to convey it to the second sheet discharge portion 6**.

The first branch portion 31 has a first switch guide 311. The first switch guide 311 pivots between, with respect to the sheet conveyed from the sheet introduction port 2 along the first sheet conveyance passage 3, a position where it guides the sheet further along the first sheet conveyance passage 3 to the first discharge port 41 and a position where it diverts the sheet from the first sheet conveyance passage 3 and guides it to the second conveyance passage 5. The first switch guide 311 pivots also to a position where it guides the sheet having undergone a folding process and having passed through a second folding conveyance passage 106, which will be described later, to the second conveyance passage 5. The first switch guide 311 is connected to a driving mechanism (not shown) and its operation is controlled by a post-processing control portion 10.

The second sheet discharge portion 6 is provided on the side face of the sheet post-processing apparatus 1 opposite from its face facing the image forming apparatus 200, above the first sheet discharge portion 4. The second sheet discharge portion 6 is disposed at the downstream end of the second conveyance passage 5 in the sheet conveyance direction. The second sheet discharge portion 6 has a second discharge port 61, a pair of second discharge rollers 62, and a second discharge tray 63.

The second discharge port 61 is located at the downstream end of the second conveyance passage 5 in the sheet conveyance direction. The pair of second discharge rollers 62 is disposed at the second discharge port 61. The second discharge tray 63 is located downstream of the second discharge port 61 in the sheet conveyance direction. The sheet conveyed along the second conveyance passage 5 to reach the second discharge port 61 is discharged through the second discharge port 61 to the second discharge tray 63 by the pair of second discharge rollers 62. The second discharge tray 63 is one of the final discharge locations of sheets having undergone post-processing by the sheet post-processing apparatus 1. Also discharged to the second discharge tray 63 are sheets that are not subjected to post-processing, small-size sheets, and the like.

The third sheet conveyance passage 7 branches off the first sheet conveyance passage 3 at a second branch portion 32 along it to extend downward up to the third sheet discharge portion 8. The direction from the second branch portion 32 to the third sheet discharge portion 8 is referred to as the sheet conveyance direction in the third sheet conveyance passage 7. The second branch portion 32 is located downstream of the first branch portion 31 with respect to the sheet conveyance direction in the first sheet conveyance passage 3, and is located at the upstream end of the third sheet conveyance passage 7 in the sheet conveyance direction. The third sheet conveyance passage 7 has a plurality of conveyance rollers **7*r*, and diverts the sheet conveyed along the first sheet conveyance passage 3 at the second branch portion 32 to convey it toward the third sheet discharge portion 8**.

The second branch portion 32 has a second switch guide 321. The second switch guide 321 pivots between a position where it guides the sheet conveyed from the sheet introduction port 2 along the first sheet conveyance passage 3 further along the first sheet conveyance passage 3 to the first discharge port 41 and a position where it guides the sheet conveyed from the sheet introduction port 2 along the first sheet conveyance passage 3 and then, after passing through the second branch portion 32, switched back, to the third sheet conveyance passage 7. The second switch guide 321 is connected to a driving mechanism (not shown) and its operation is controlled by the post-processing control portion 10.

The third sheet discharge portion 8 is provided on the side face of the sheet post-processing apparatus 1 opposite from its side face facing the image forming apparatus 200, below the first sheet discharge portion 4 (near a lower end part of the sheet post-processing apparatus 1). The third sheet discharge portion 8 has a third discharge port 81, a pair of third discharge rollers 82, and a third discharge tray 83.

The third discharge port 81 is located at the downstream end of the third sheet conveyance passage 7 in the sheet conveyance direction. The pair of third discharge rollers 82 is disposed at the third discharge port 81. The third discharge tray 83 is located downstream of the third discharge port 81 in the sheet conveyance direction. The sheet conveyed along the third sheet conveyance passage 7 to reach the third discharge port 81 is discharged through the third discharge port 81 to the third discharge tray 83 by the pair of third discharge rollers 82. The third discharge tray 83 is one of the final discharge locations of sheets having undergone post-processing by the sheet post-processing apparatus 1.

The post-processing portion 9 performs predetermined post-processing on sheets having images formed by the image forming apparatus 200 and introduced into the sheet post-processing apparatus 1. The post-processing portion 9 includes a punching portion 91, a sheet binding unit 92, a sheet folding unit 100, and a bookbinding portion 94.

The punching portion 91 is disposed closely downstream of the sheet introduction port 2 of the first sheet conveyance passage 3. The punching portion 91 performs a punching process on the sheet conveyed along the first sheet conveyance passage 3 to form punch holes in it.

The sheet binding unit 92 is disposed closely upstream of the first sheet discharge portion 4 with respect to the sheet conveyance direction in the first sheet conveyance passage 3. The sheet binding unit 92 performs a stapling (binding) process on a bunch of sheets formed by stacking together a plurality of sheets to bind the bunch of sheets. The configuration of the sheet binding unit 92 will be described in detail later.

The sheet folding unit 100 is disposed, with respect to the sheet conveyance direction in the first sheet conveyance passage 3, downstream of the punching portion 91, upstream of the sheet binding unit 92. The sheet folding unit 100 performs a folding process on a single sheet to form a fold line in it. The sheet folding unit 100 can perform, on a single sheet, folding processes such as double folding, Z-folding, outer triple folding, and inner triple folding.

The bookbinding portion 94 is disposed closely upstream of the third sheet discharge portion 8 with respect to the sheet conveyance direction in the third sheet conveyance passage 7. The bookbinding portion 94 has a middle folding portion 941 and a middle binding portion 942. The bookbinding portion 94 performs, on a stack of sheets formed by stacking together a plurality of sheets, a middle-folding process and a middle-binding process by folding and binding it in a substantially middle part of the bundle along the sheet conveyance direction, and thereby forms a booklet.

The post-processing control portion (control portion) 10 includes a CPU, a storage portion, and other electronic circuits and electronic components (none are shown). The post-processing control portion 10 is connected to the main unit control portion 203 (see FIG. 1) in the image forming apparatus 200 such that communication is possible between them. The post-processing control portion 10 receives instructions from the main unit control portion 203 and controls, with the CPU, the operation of the components in the sheet post-processing apparatus 1 based on the control programs and control data stored in the storage portion to carry out processes related to the functions of the sheet post-processing apparatus 1. The first sheet conveyance passage 3, the first sheet discharge portion 4, the second conveyance passage 5, the second sheet discharge portion 6, the third sheet conveyance passage 7, the third sheet discharge portion 8, and the post-processing portion 9 individually receives instructions from the post-processing control portion 10 and cooperate to perform post-processing on sheets. The functions of the post-processing control portion 10 can be assumed by the main unit control portion 203 in the image forming apparatus 200.

Figure 3:
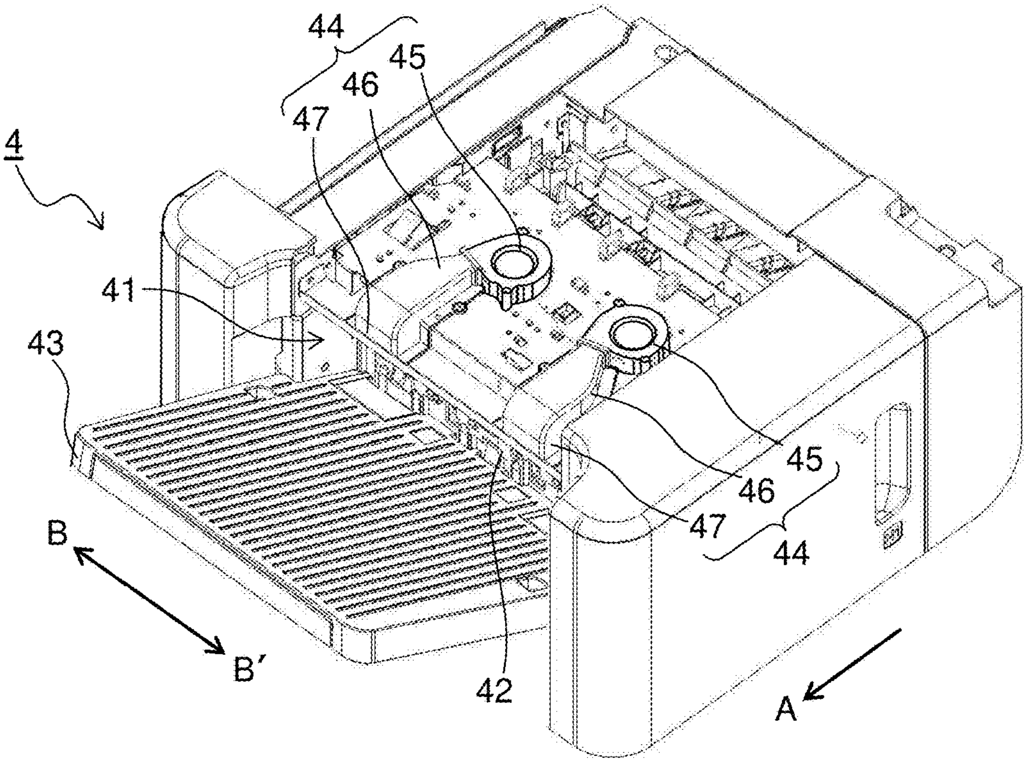
FIG. 3 is a perspective view around a first sheet discharge portion in the sheet post-processing apparatus according to the embodiment.

3. Configuration of the First Sheet Discharge Portion: Next, the configuration around the first sheet discharge portion 4 will be described. FIG. 3 is a perspective view around the first sheet discharge portion 4. As shown in FIG. 3, the first sheet discharge portion 4 (sheet discharging apparatus) includes, in addition to the first discharge port 41, the pair of first discharge rollers 42, and the first discharge tray 43 already mentioned, a blowing mechanism 44. The blowing mechanism 44 includes a blowing device 45, a blowing duct 46, and a blowing port 47.

A pair of blowing devices 45 are disposed above the first discharge port 41, at opposite sides along the sheet width direction (arrow BB' direction) orthogonal to the sheet discharge direction (arrow A direction). In this embodiment, a sirocco fan is used as the blowing device 45.

A pair of blowing ducts 46 are disposed at opposite sides along the sheet width direction, and extend in the sheet discharge direction. One end part of the blowing duct 46 (an upstream end part in the sheet discharge direction) is coupled to the outlet port of the blowing device 45. Another end part of the blowing duct 46 (a downstream end part in the sheet discharge direction) has a blowing port 47. The blowing port 47 opens downward, above the first discharge port 41.

Figure 4:
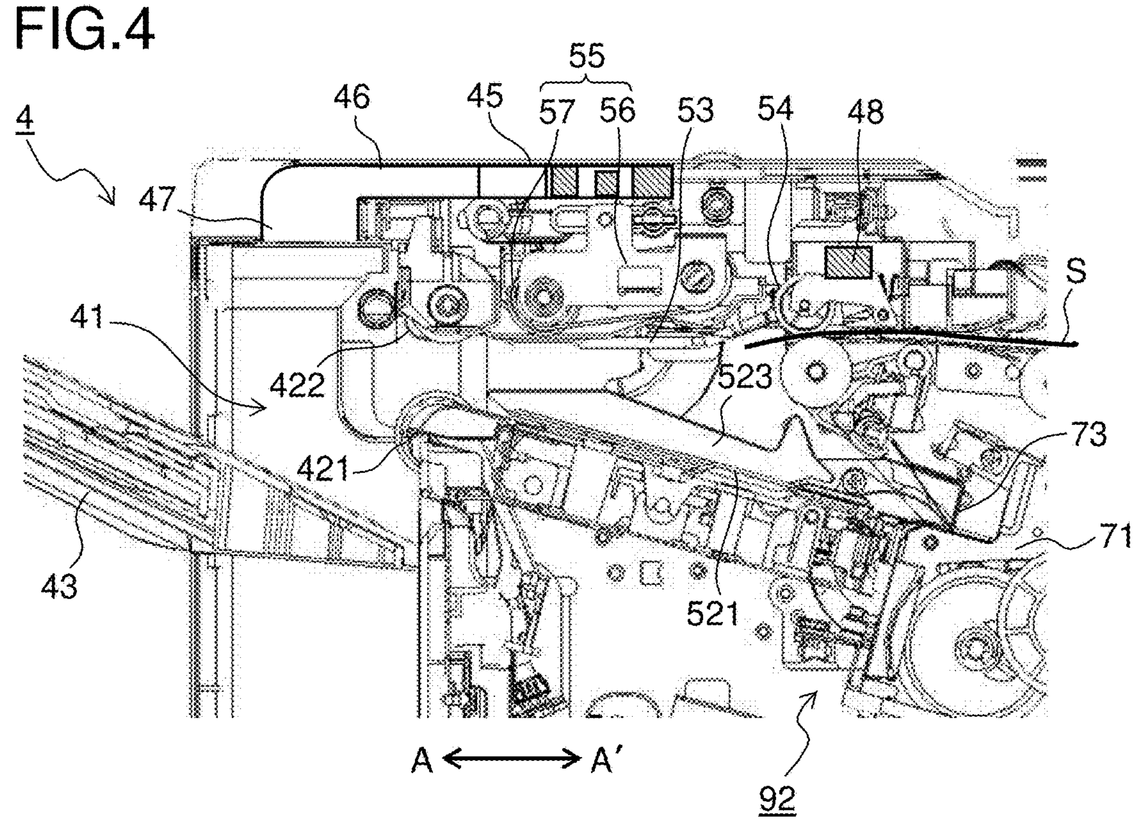
FIG. 4 is a side sectional view around the first sheet discharge portion in the sheet post-processing apparatus according to the embodiment.

FIG. 4 is a side sectional view around the first sheet discharge portion 4. As shown in FIG. 4, upstream (to the right in FIG. 4) of the first sheet discharge portion 4 with respect to the sheet discharge direction (arrow A direction), the sheet binding unit 92 is disposed. The sheet binding unit 92 includes a processing tray 521, a stapling portion 71, and a reference plate 73.

The processing tray 521 is a rectangular tray that extends in both the sheet discharge direction (arrow A direction) and the sheet width direction (arrow BB' direction). The processing tray 521 is for stacking a plurality of sheets (bundle of sheets) to be subjected to a stapling process. Sheets S are brought into the processing tray 521 by a pair of loading rollers 43 in the same direction (loading direction, arrow A direction) as the discharge direction. The stapled bundle of sheets is fed out in the sheet discharge direction by the pair of first discharge rollers 42 to be discharged to the first discharge tray 43.

The processing tray 521 includes a width restricting member 523. A pair of width restricting members 523 are disposed along the sheet width direction. The width restricting member 523 is reciprocatably movable along the sheet width direction across the top face of the processing tray 521 via a driving mechanism (not shown) such as a rack and a pinion gear. In this embodiment, every time a sheet S is brought into the processing tray 521, the width restricting member 523 is driven to reciprocatably move by a driving mechanism. Thus, the sheets S brought into the processing tray 521 are aligned in position along the sheet width direction.

The stapling portion 71 is disposed to face the downstream edge of the sheets S in the alignment direction (arrow A' direction) opposite to the loading direction. The stapling portion 71 is movable along the sheet width direction (arrow BB' direction) along the edge of the sheets under a driving force from a motor (not shown) to perform a stapling process on the bundle of sheets S.

The reference plate 73 is fixed to the processing tray 521 so as to face a downstream (rightward in FIG. 4) end part of the processing tray 521 in the alignment direction. The reference plate 73 is substantially in a U-shape open toward upstream (leftward in FIG. 4) in the alignment direction as seen on a section orthogonal to the sheet width direction. The reference plate 73 abuts on the edge of the sheets brought into the processing tray 521 and aligns the sheets in the alignment direction (arrow A' direction).

Above the processing tray 521, a pair of loading rollers 54 is disposed. Near the pair of loading rollers 54, a sheet sensor 48 is disposed. The sheet sensor 48 senses the timing of the passage of a sheet S through the pair of loading rollers 54. Used as the sheet sensor 48 is, for example, a PI (photo-interrupter) sensor comprising a light emitter and a light receiver.

Downstream (to the left in FIG. 4) of the pair of loading rollers 54 with respect to the loading direction of the sheet S, a slapping member 53 and an alignment member 55 are provided. When the trailing end of the sheet S has passed through the pair of loading rollers 54, the slapping member 53 swings downward to slap the sheet S downward to align it with the processing tray 521.

The alignment member 55 is disposed one at each of a plurality of (four in this embodiment) places along the sheet width direction (direction perpendicular to the plane of FIG. 4). The alignment member 55 moves (switches back) the sheet S brought into the processing tray 521 in the alignment direction so that it approaches the reference plate 73, and thereby assist in aligning the sheet S. The alignment member 55 includes a paddle holder 56 and an alignment paddle 57.

The paddle holder 56 is supported in a lower end part of a conveying frame (not shown) so as to be swingable in the loading direction of the sheet S. The swing shaft of the paddle holder 56 is fed with a rotational driving force from a paddle driving motor (not shown). The alignment paddle 57 is fed with a rotational driving force from a driving source (not shown) such as a motor in such a direction (counterclockwise in FIG. 4) as to feed out the sheet S in the alignment direction. The alignment paddle 57 rotates while in contact with the top face of the sheet brought into the processing tray 521; it thereby moves the sheet S in the alignment direction to align its edge by thrusting it against the reference plate 73.

The swinging of the paddle holder 56 is controlled based on the timing of the sensing by the sheet sensor 48. Specifically, when the sheet sensor 48 senses the leading end of the sheet S having passed through the pair of loading rollers 54, the paddle holder 56 is swung upward. As a result, the alignment paddle 57 moves away from the processing tray 521 (or the sheet S on the processing tray 521).

FIG. 4 shows a state immediately before a new sheet is brought into the processing tray 521, in which state the paddle holder 56 is swung up (clockwise) and the alignment paddle 57 is located at a position (reference position) away from the processing tray 521. Moreover the nip between a lower discharge roller 421 and an upper discharge roller 422 in the pair of first discharge rollers 42 are released. Thus, the sheet S brought from the pair of loading rollers 54 into the processing tray 521 once passes through the pair of discharge rollers 42 until it protrudes to above the first discharge tray 43.

The trailing end of the new sheet S brought into the processing tray 521 is slapped with the slapping member 53 to be aligned with the processing tray 521, and then the paddle holder 56 is swung in the reverse direction (counterclockwise). As a result, the alignment paddle 57 is located at a position at which it makes contact with the top face of the sheet S. In this state, the alignment paddle 57 is rotated, so that the sheet S is pulled in in the alignment direction (arrow A' direction) across the processing tray 521. By operating this operation every time a sheet S is brought in, it is possible to reliably bring the alignment paddle 57 into contact with the top face of the sheet while avoiding interference between the leading end of the sheet S brought into the processing tray 521 and the alignment paddle 57.

After that, the sheet S is fed further downstream in the alignment direction by the alignment paddle 57 to be stacked in a state aligned along the sheet width direction by the width restricting member 523 and aligned along the loading direction by the reference plate 73.

Then, after the stapling portion 71 moves to a predetermined stapling position, the post-processing control portion 10 transmits a control signal to the stapling portion 71 to perform a stapling process on a plurality of sheets S aligned by the reference plate 73. The post-processing control portion 10 brings the pair of first discharge rollers 42 into contact with each other (form a nip) and rotates the pair of first discharge rollers 42 in the discharge direction. Thus, the stapled bundle of sheets S is discharged by the pair of first discharge rollers 42 to the first discharge tray 43.

Figure 5:
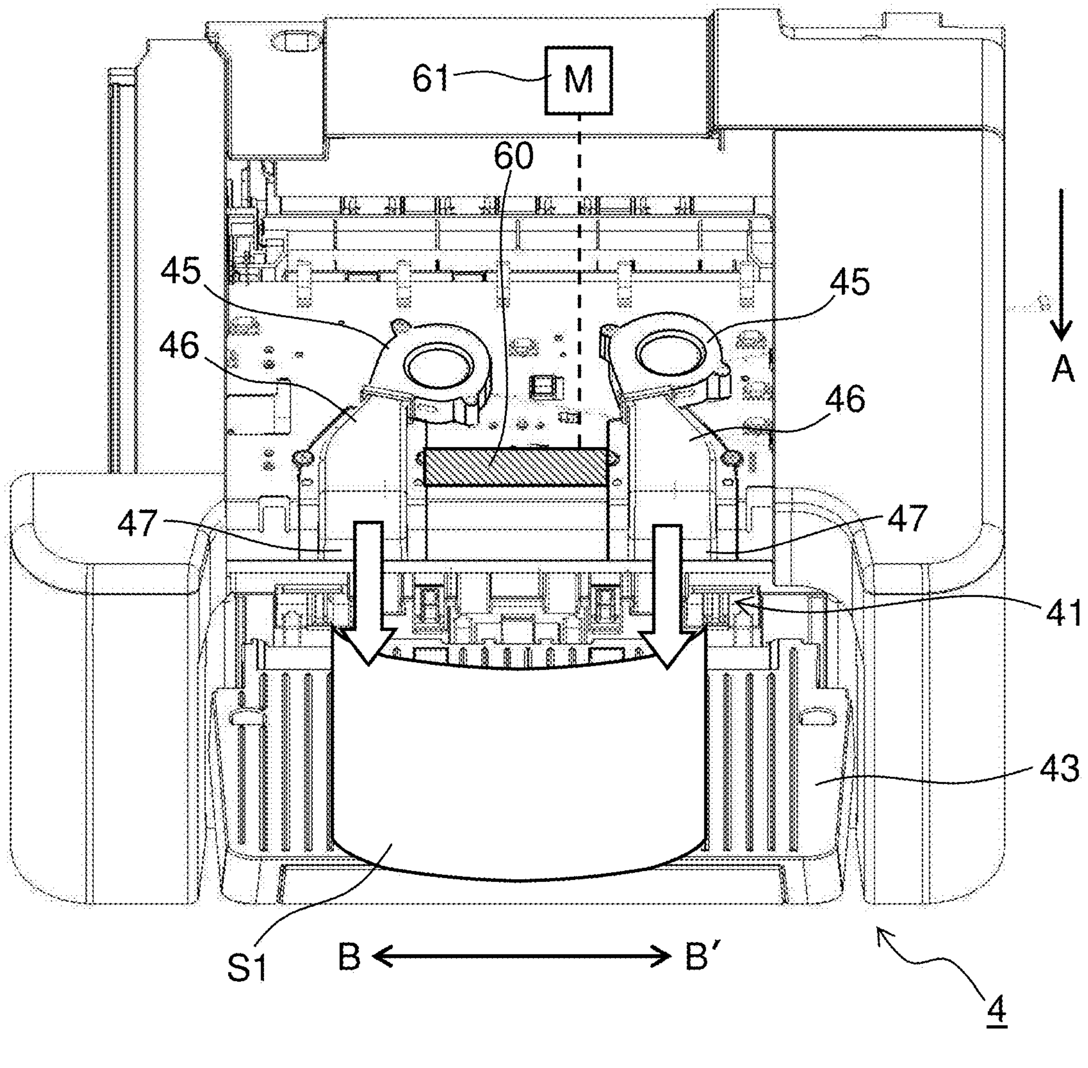
FIG. 5 is a perspective view, as seen from above, of how a large-size sheet is discharged to the first sheet discharge portion according to a first embodiment of the present disclosure.

4. Blowing Mechanism's Operation to Assist Discharge of a Sheet to the 1st Discharge Tray: Next, a description will be given of the operation of a blowing mechanism 44 for assisting the discharge of a sheet to the first discharge tray 43. FIG. 5 is a perspective view, as seen from above, of how a sheet S is discharged to the first sheet discharge portion 4. When a sheet S for which no post-processing is to be performed is discharged, the blowing mechanism 44 blows air from above toward opposite end parts of the sheet S along the width direction to suppress upward curls that develop in opposite end parts of the sheet S along the width direction.

As shown in FIG. 5, the first sheet discharge portion 4 includes a duct moving mechanism 60 and a duct moving motor 61 coupled to the duct moving mechanism 60. The duct moving mechanism 60 moves the pair of blowing ducts 46 along the sheet width direction. In this embodiment, used as the duct moving mechanism 60 is a rack-and-pinion mechanism.

Specifically, the duct moving mechanism 60 includes (though none is shown) a pinion gear and a pair of racks fixed to the pair of blowing ducts 46 respectively. The pinion gear is fed with a rotational driving force from the duct moving motor 61. The pair of racks each extend along the sheet width direction and have formed on them rack teeth that mesh with the pinion gear from the side opposite from its rotation center.

Rotating the pinion gear in a predetermined direction with the duct moving motor 61 permits the blowing ducts 46 together with the blowing devices 45 to move in left-to-right symmetry with respect to the middle along the sheet width direction. For example, rotating the pinion gear forward causes the blowing devices 45 and the blowing ducts 46 to move outward along the sheet width direction; rotating the pinion gear reversely causes the blowing devices 45 and the blowing ducts 46 to move inward along the sheet width direction.

FIG. 5 shows a case where a large-size sheet S1 is discharged to the first discharge tray 43. In this case, the blowing devices 45 and the blowing ducts 46 are disposed at positions where they face opposite end parts of the sheet S1 along the width direction. As indicated by hollow arrows in FIG. 5, the streams of air produced by the blowing devices 45 pass through the blowing ducts 46 and are blown from the blowing ports 47 downward toward regions on the sheet S1 discharged to the first discharge tray 43 inward of the sheet's side edges along the width direction.

Figure 6:
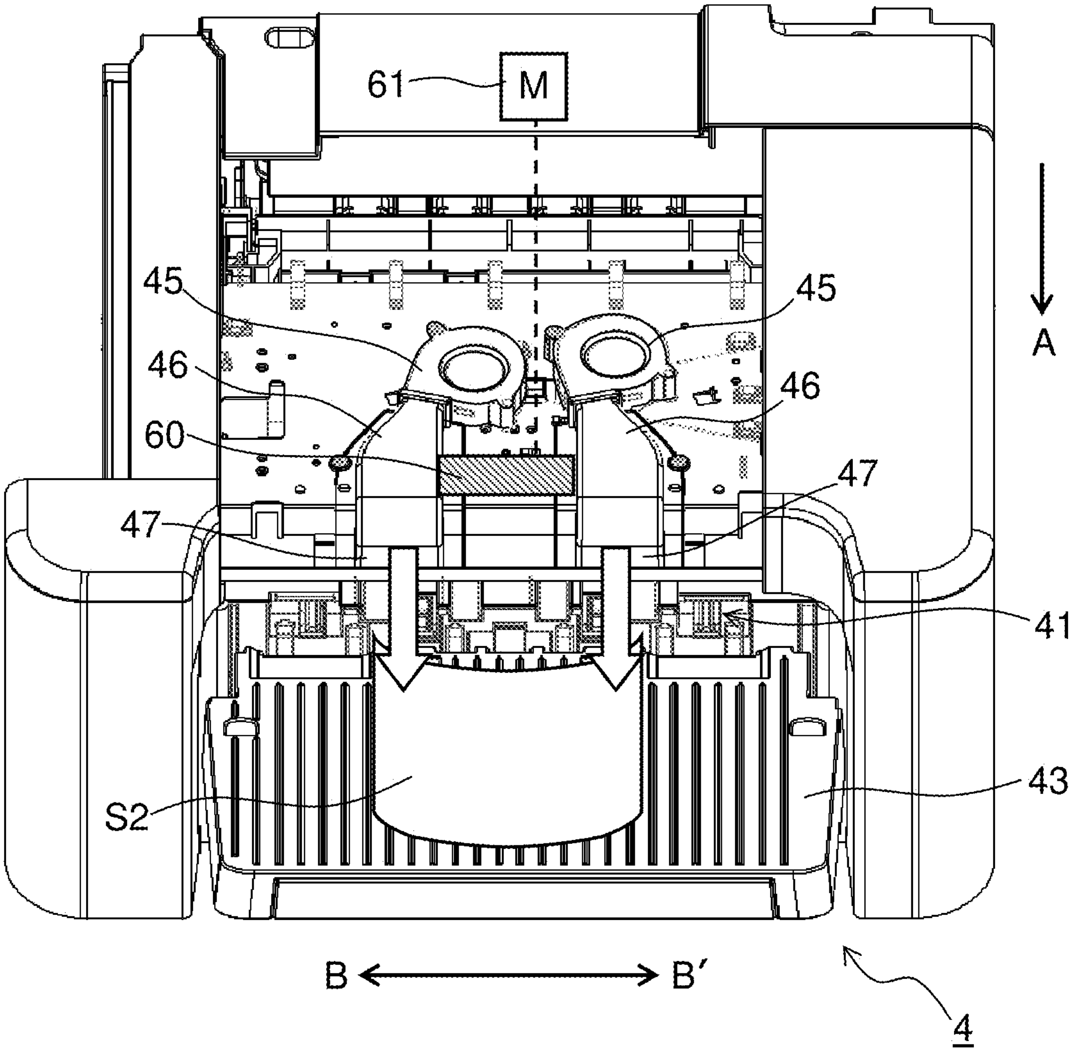
FIG. 6 is a perspective view, as seen from above, of how a small-size sheet is discharged to the first sheet discharge portion according to the first embodiment.

FIG. 6 shows a case where a small-size sheet S2 is discharged to the first discharge tray 43. In this case, the blowing devices 45 and the blowing ducts 46 move from their positions in FIG. 5 inward along the sheet width direction to be disposed at positions where they face opposite end parts of the sheet S2 along the width direction. As indicated by hollow arrows in FIG. 6, the streams of air produced by the blowing devices 45 pass through the blowing ducts 46 and are blown from the blowing ports 47 downward toward regions on the sheet S2 discharged to the first discharge tray 43 inward of the sheet's side edges along its width direction.

With the above configuration, by moving the blowing devices 45 and the blowing ducts 46 along the sheet width direction according to the size along the width direction of the sheet S discharged to the first discharge tray 43, it is possible to change the blowing position of the blowing mechanism 44 with respect to the first discharge tray 43. It is thus possible to suppress upward curls developing in opposite end part of the sheet S along the width direction regardless of the size of the sheet S along the width direction. This helps improve the alignment of sheets S discharged to the first discharge tray 43.

Figure 7:
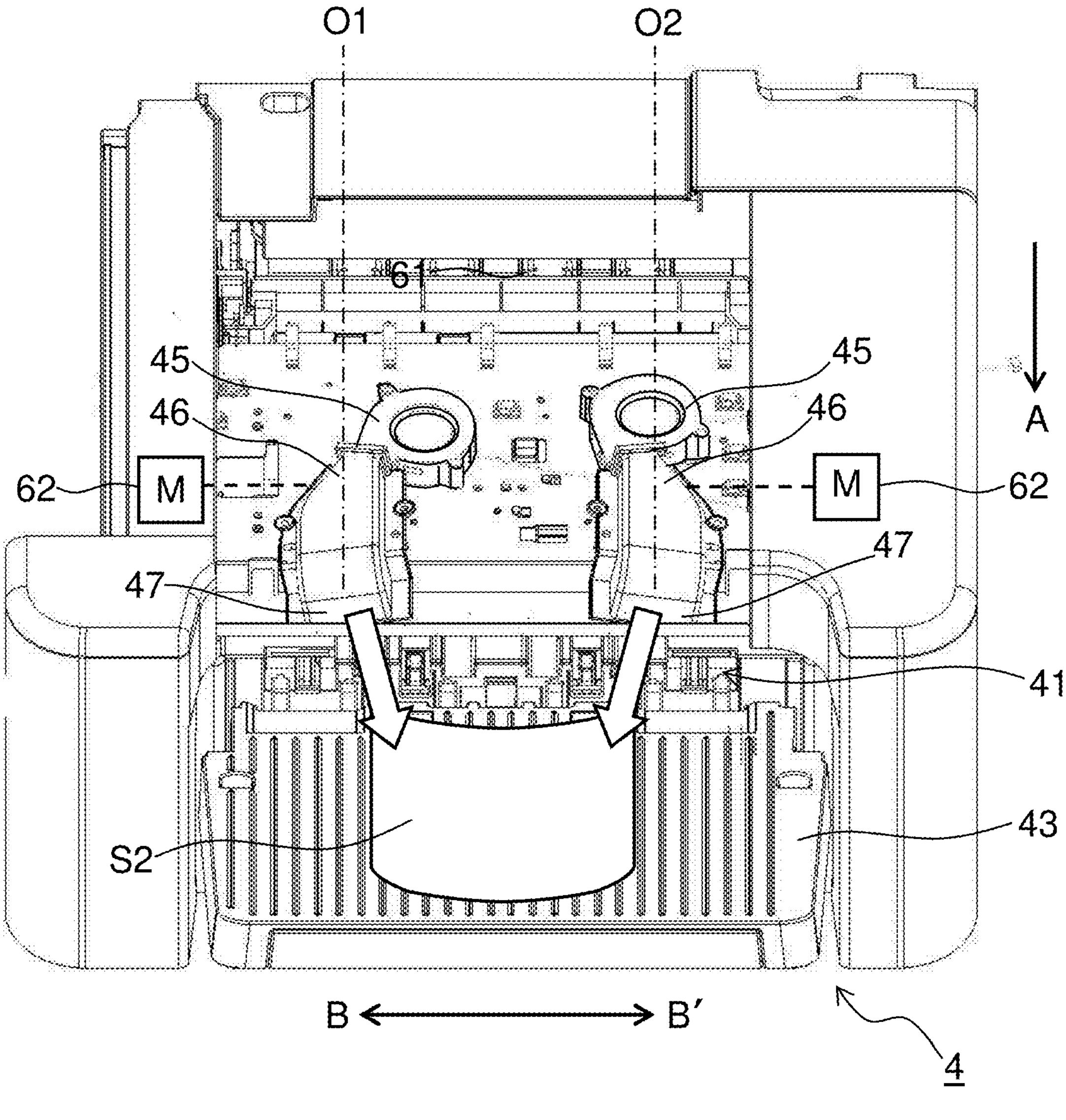
FIG. 7 is a perspective view, as seen from above, of how a small-size sheet is discharged to the first sheet discharge portion according to a second embodiment of the present disclosure.

FIG. 7 is a perspective view, as seen from above, of how a small-size sheet S2 is discharged to the first sheet discharge portion 4 according to a second embodiment of the present disclosure. In this embodiment, the blowing ducts 46 are swingable about swing axes O1 and O2 parallel to the sheet discharge direction. Moreover, in place of the duct moving mechanism 60 and the duct moving motor 61 in the first embodiment, duct swing motors 62 are provided.

FIG. 7 shows how a small-size sheet S2 is discharged to the first discharge tray 43. In this case, from the state in FIG. 5, the blowing ducts 46 are each swung such that the blowing ports 47 point inward along the sheet width direction. As indicated by hollow arrows in FIG. 7, the streams of air produced by the blowing devices 45 pass through the blowing ducts 46 and are blown from the blowing ports 47 downward toward regions on the sheet S2 discharged to the first discharge tray 43 inward of the sheet's side edges along the width direction.

In a case where a large-size sheet S1 is discharged to the first discharge tray 43, from the state in FIG. 7, the blowing ducts 46 are swung such that their blowing ports 47 point outward along the sheet width direction to establish the state in FIG. 5. Thus, as indicated by hollow arrows in FIG. 5, the streams of air produced by the blowing devices 45 pass through the blowing ducts 46 and are blown from the blowing port 47 downward toward regions on the sheet S1 discharged to the first discharge tray 43 inward of the sheet's side edges along the width direction.

With the above configuration, by changing the angle of the blowing ports 47 by swinging the blowing ducts 46 according to the size along the width direction of the sheet S discharged to the first discharge tray 43, it is possible to change the blowing position of the blowing mechanism 44 with respect to the first discharge tray 43. It is thus possible, as in the first embodiment, to suppress upward curls developing in opposite end part of the sheet S along the width direction regardless of the size of the sheet S along the width direction. This helps improve the alignment of sheets S discharged to the first discharge tray 43.

Moreover, simply swinging the blowing ducts 46 permits the change of the blowing position of the blowing mechanism 44, and it is thus not necessary to provide the duct moving mechanism 60 or secure a space for the movement of the blowing ducts 46 as in the first embodiment. It is thus possible to reduce the number of components as compared with the first embodiment and achieve a compact configuration.

In the first and second embodiments described above, it is preferable that, until the leading end of the sheet S discharged by the pair of first discharge rollers 42 makes contact with the first discharge tray 43 (or the sheet S on the first discharge tray 43), the blowing mechanism 44 keep from blowing air and that, after the leading end of the sheet S makes contact with the first discharge tray 43 (or the sheet S on the first discharge tray 43), the blowing mechanism 44 start blowing air.

Specifically, when the sheet sensor 48 (see FIG. 4) transmits the timing of its sensing the leading end of the sheet S (a sensing signal), the post-processing control portion 10 checks whether a predetermined time T has elapsed since the timing of the sensing. When the predetermined time T has elapsed, the post-processing control portion 10 judges that the leading end of the sheet S has made contact with the first discharge tray 43 (or the sheet S on the first discharge tray 43) and transmits a control signal to the blowing device 45 to start blowing air. The predetermined time T is calculated based on the discharge speed of the sheet S.

By starting blowing air with the timing described above, it is possible to blow a stream of air predominantly to the trailing end of the sheet S in the discharge direction where curls tend to develop while suppressing the flapping of the leading end of the sheet S in the discharge direction caused by the blowing of air. It is thus possible to stably discharge the sheet S through the first discharge port 41 and to stack the sheet S on the first discharge tray 43 while effectively suppressing curls in its trailing end.

In addition to the adjustment of the blowing position described above, the flow rate of the stream of air produced by the blowing device 45 can be adjusted based on the size of the sheet S along the width direction. Specifically, the post-processing control portion 10 can increase the flow rate of the stream of air produced by the blowing device 45 as the size of the sheet S along the width direction increases. It is thus possible to increase the flow rate of the stream of air blown to a large-size sheet S with large curls and thereby to more effectively suppress the curls. The flow rate of the stream of air can be adjusted by controlling a driving voltage applied to the blowing device 45 according to a control signal from the post-processing control portion 10.

Figure 8:
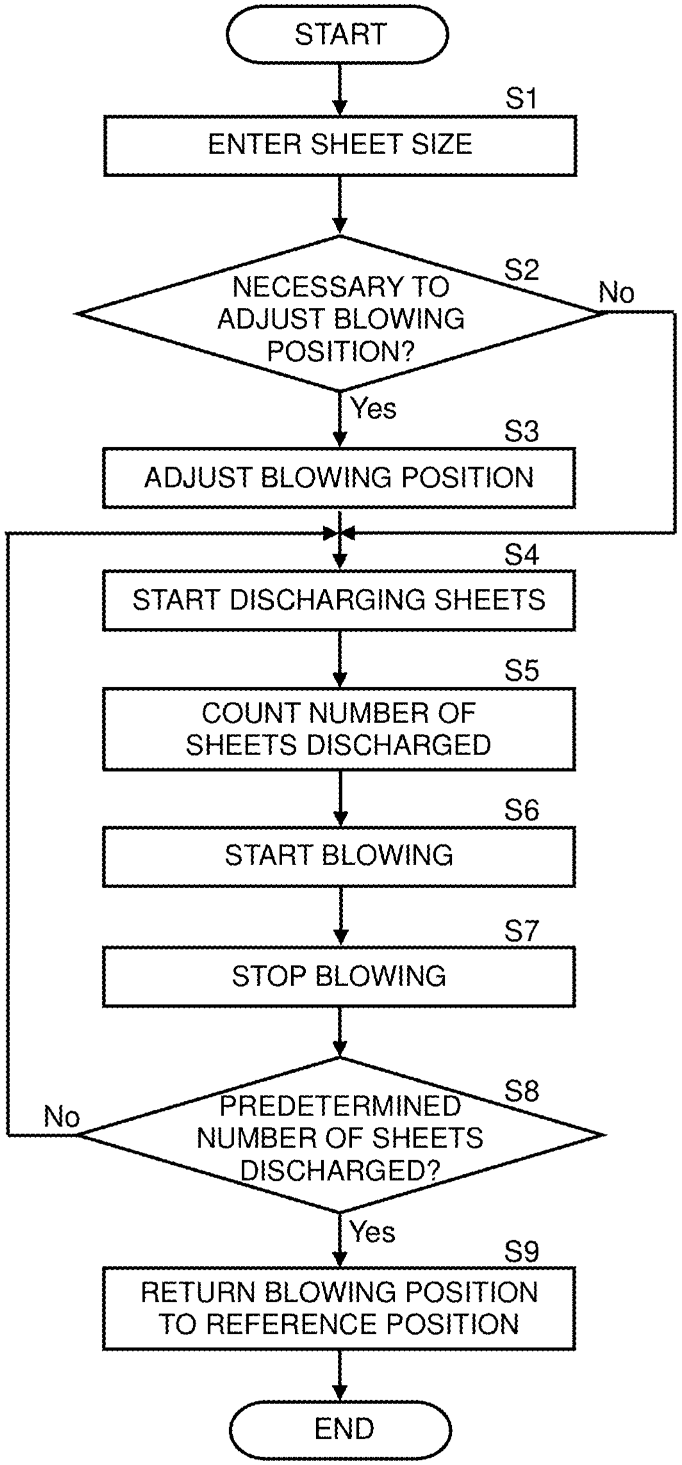
FIG. 8 is a flow chart showing an example of control for adjustment of a blowing position of the blowing mechanism in the first sheet discharge portion according to the present disclosure.

FIG. 8 is a flow chart showing an example of control for adjustment of the blowing position by the blowing mechanism 44 in the first sheet discharge portion 4 according to this embodiment. With reference to FIGS. 1 to 7 as necessary, along the steps in FIG. 8, a procedure for adjustment of the blowing position will be described. It is assumed that, in the initial state, the blowing position of the blowing mechanism 44 with respect to the first discharge tray 43 is set at a blowing position (in the following description, referred to as the reference position) corresponding the size of the most frequently used sheet S (e.g., A4 landscape).

When a command to discharge a sheet S to the first sheet discharge portion 4 is fed in from the main unit control portion 203 in the image forming apparatus 200, along with the discharge command, the size of the sheet S is fed in (Step S1). The size of the sheet S is entered on the operation panel 202 of the image forming apparatus 200. For example, the manufacturer, product name, product number, and the like of a sheet S can be stored beforehand in the main unit control portion 203 in a form associated with information on the size of the sheet S. Then the user can simply select the manufacturer, product name, product number, or the like of a sheet S on the operation panel 202 to make the main unit control portion 203 recognize the size of the sheet S.

Based on the size of the sheet S fed in, the post-processing control portion 10 judges whether it is necessary to adjust the blowing position of the blowing mechanism 44 with respect to the first discharge tray 43 (Step S2). If it is judged that it is necessary to adjust the blowing position (S2, Yes), the post-processing control portion 10 adjusts the blowing position with respect to the first discharge tray 43 from the reference position (Step S3).

For example, in the first sheet discharge portion 4 according to the first embodiment, the duct moving motor 61 is driven to move the blowing devices 45 and the blowing ducts 46 along the sheet width direction. Specifically, if the size of the sheet S along the width direction is larger than A4 landscape, the blowing devices 45 and the blowing ducts 46 are moved outward along the sheet width direction to move the blowing position outward of the reference position along the width direction. If the size of the sheet S along the width direction is smaller than A4 landscape, the blowing devices 45 and the blowing ducts 46 are moved inward along the sheet width direction to move the blowing position inward of the reference position along the width direction.

On the other hand, in the first sheet discharge portion 4 according to the second embodiment, the duct swing motors 62 are driven to swing the blowing ducts 46. Specifically, if the size of the sheet S along the width direction is larger than A4 landscape, the blowing ducts 46 are swung such that the blowing ports 47 point outward along the sheet width direction to move the blowing position outward of the reference position along the width direction. If the size of the sheet S along the width direction is smaller than A4 landscape, the blowing ducts 46 are swung such that the blowing ports 47 point inward along the sheet width direction to move the blowing position inward of the reference position along the width direction.

The degree of adjustment (the distance moved, the angle swung) from the reference position is determined based on a compensation table that defines the relationship between the size of the sheet and the corresponding blowing position. If it is judged that it is not necessary to adjust the blowing position (Step S2, No), the post-processing control portion 10 does not change the blowing position from the reference position and advances to the next step.

Next, the post-processing control portion 10 starts to discharge sheets S to the first discharge tray 43 (Step S4) and counts the number of discharged sheets S based the result of the sensing by the sheet sensor 48 (Step S5). Then the post-processing control portion 10 makes the blowing mechanism 44 start to blow air (Step S6). Specifically, after the leading end of the sheet S discharged by the pair of first discharge rollers 42 makes contact with the first discharge tray 43 (or the sheet S on the first discharge tray 43), the post-processing control portion 10 turns the blowing device 45 from off to on.

Next, the post-processing control portion 10 makes the blowing mechanism 44 stop blowing air (Step S7). Specifically, when the trailing end of the sheet S discharged by the pair of first discharge rollers 42 makes contact with the first discharge tray 43 (or the sheet S on the first discharge tray 43), the post-processing control portion 10 turns the blowing device 45 from on to off.

Next, the post-processing control portion 10 checks whether a predetermined number of sheets S have been discharged to the first discharge tray 43 (Step S8). If the predetermined number of sheets S have not been discharged (Step S8, No), the post-processing control portion 10 returns to Step S4 to continue to discharge a new sheet S, count the number of discharged sheets, and make the blowing mechanism 44 start and stop blowing air (Steps S4 to S47).

If the predetermined number of sheets S have been discharged (Step S8, Yes), the post-processing control portion 10 transmits a control signal to the duct moving motor 61 (or the duct swing motors 62) to return the blowing position to the reference position (Step S9) and ends the procedure.

With the example of control shown in FIG. 8, based on the size of the sheet S along the width direction, the blowing position of the blowing mechanism 44 is adjusted to an optimal position. It is thus possible to suppress curls with a stream of air in opposite end parts of the sheet S along the width direction regardless of the size of the sheet S and thereby achieve satisfactory stacking and discharging performance of the first discharge tray 43 with respect to the sheet S.

In particular, in a case where, as in this embodiment, the image forming apparatus 200 coupled to the sheet post-processing apparatus 1 is an inkjet recording apparatus, the sheets S discharged tend to develop large curls. Even then it is possible to stably discharge and stack the sheets S.

The embodiments of the present disclosure described above are not meant to limit the scope of the present disclosure, which thus allows for many modifications without departure from the spirit of the present disclosure. For example, while in the above embodiments the post-processing control portion 10 automatically adjusts the blowing position of the blowing mechanism 44 based on information on the size of the sheet S, a configuration is also possible where the user can adjust the blowing position of the blowing mechanism 44 with desired timing. For example, a blowing position adjustment mode for switching the blowing position of the blowing mechanism 44 can be provided on the operation panel 202 so that the user can select the mode according to the size of the sheet discharged to the first discharge tray 43.

While in the above embodiments information on the size of the sheet S is entered on the operation panel 202 of the image forming apparatus 200, information on the size of the sheet S can be acquired automatically. For example, with a sheet size sensor disposed at any position along the sheet conveyance passage from the image forming apparatus 200 to the sheet post-processing apparatus 1, the size of the sheet S brought from the image forming apparatus 200 into the sheet post-processing apparatus 1 can be sensed. Usable as the sheet size sensor is, for example, a PI (photo-interrupter) sensor having a sensing portion comprising a light emitter and a light receiver.

While in the above embodiments the blowing device 45 and the blowing port 47 are coupled together via the blowing duct 46, the blowing device 45 and the blowing port 47 can be coupled together directly with no blowing duct 46 in between.

While in the above embodiments the first sheet discharge portion 4 is taken as an example of a sheet discharging apparatus according to the present disclosure, the present disclosure is applicable not only to it but also to the second sheet discharge portion 6.

While in the above embodiments an inkjet recording apparatus is taken as an example of the image forming apparatus 200, the image forming apparatus 200 can be an electrophotographic printer or copier. In an inkjet recording system, where ink is ejected onto a sheet, the sheet more tends to develop curls as compared with in an electrophotographic system. Accordingly, the present disclosure is particularly useful for a sheet post-processing apparatus 1 that is coupled to an inkjet recording apparatus as the image forming apparatus 200.

While in the above embodiments the first sheet discharge portion 4 in the sheet post-processing apparatus 1 coupled to the image forming apparatus 200 is taken as an example of a sheet discharging apparatus according to the present disclosure, a sheet discharging apparatus according to the present disclosure can be applied to a sheet discharge portion in an image forming apparatus 200 that is used without being coupled to a sheet post-processing apparatus 1.

The present disclosure finds applications in sheet discharging apparatuses that discharge sheets, and in sheet post-processing apparatuses and image forming apparatuses provided with such sheet discharging apparatuses.

What is claimed is:

1. A sheet discharging apparatus comprising:

a sheet discharge port through which a sheet is discharged;

a discharging member disposed at the sheet discharge port, the discharging member conveying the sheet in a discharge direction;

a sheet discharge tray disposed downstream of the sheet discharge port with respect to the discharge direction, the sheet discharge tray having stacked thereon the sheet discharged from the sheet discharge port; and a blowing mechanism that blows a stream of air to the sheet discharged from the sheet discharge port, wherein the blowing mechanism has:

a pair of blowing ports through which the stream of air is blown from upward to opposite end parts, along a width direction orthogonal to the discharge direction of the sheet, of the sheet discharged from the sheet discharge port; and a blowing device coupled to the blowing ports, the blowing device producing the stream of air a blowing position of the stream of air with respect to the sheet can be adjusted according to a size of the sheet along the width direction, further comprising:

a swinging mechanism that swings the blowing ports about a swing axis parallel to the discharge direction, wherein the blowing position is adjusted by changing an angle of the blowing ports by use of the swinging mechanism.

2. The sheet discharging apparatus according to claim 1, wherein an input portion to which a size of the sheet is inputted; and a control portion that controls the blowing mechanism and the moving mechanism, wherein the control portion adjusts the blowing position by changing the angle of the blowing ports based on the size of the sheet along the width direction as inputted to the input portion.

3. The sheet discharging apparatus according to claim 2, wherein when or after a leading end of the sheet makes contact with the sheet discharge tray or a sheet on the sheet discharge tray, the control portion makes the blowing device start to blow the stream of air.

4. The sheet discharging apparatus according to claim 1, further comprising:

an input portion to which a size of the sheet is inputted; and a control portion that controls the blowing mechanism and the swinging mechanism, wherein the control portion adjusts the blowing position by changing the angle of the blowing ports based on the size of the sheet along the width direction as inputted to the input portion.

5. The sheet discharging apparatus according to claim 4, wherein the control portion can adjust a flow rate of the stream of air produced by the blowing device based on the size of the sheet along the width direction as inputted to the input portion.

6. A sheet post-processing apparatus comprising:

a post-processing portion that performs predetermined post-processing on a sheet; and the sheet discharging apparatus according to claim 1 that discharges the sheet having the post-processing performed thereon by the post-processing portion.

7. An image forming system comprising:

an image forming apparatus that forms an image on a sheet; and the sheet post-processing apparatus according to claim 6 that performs predetermined post-processing on the sheet having the image formed thereon by the image forming apparatus.

8. The image forming system according to claim 7, wherein the image forming apparatus is an inkjet recording apparatus that records in image by ejecting ink onto the sheet.

9. An image forming apparatus comprising:

an image forming portion that forms an image on a sheet; and the sheet discharging apparatus according to claim 1 that discharges the sheet having the image formed thereon by the image forming portion.

10. The image forming apparatus according to claim 9, wherein the image forming portion records an image by ejecting ink onto the sheet.

* * * * *